Patented Nov. 6, 1951

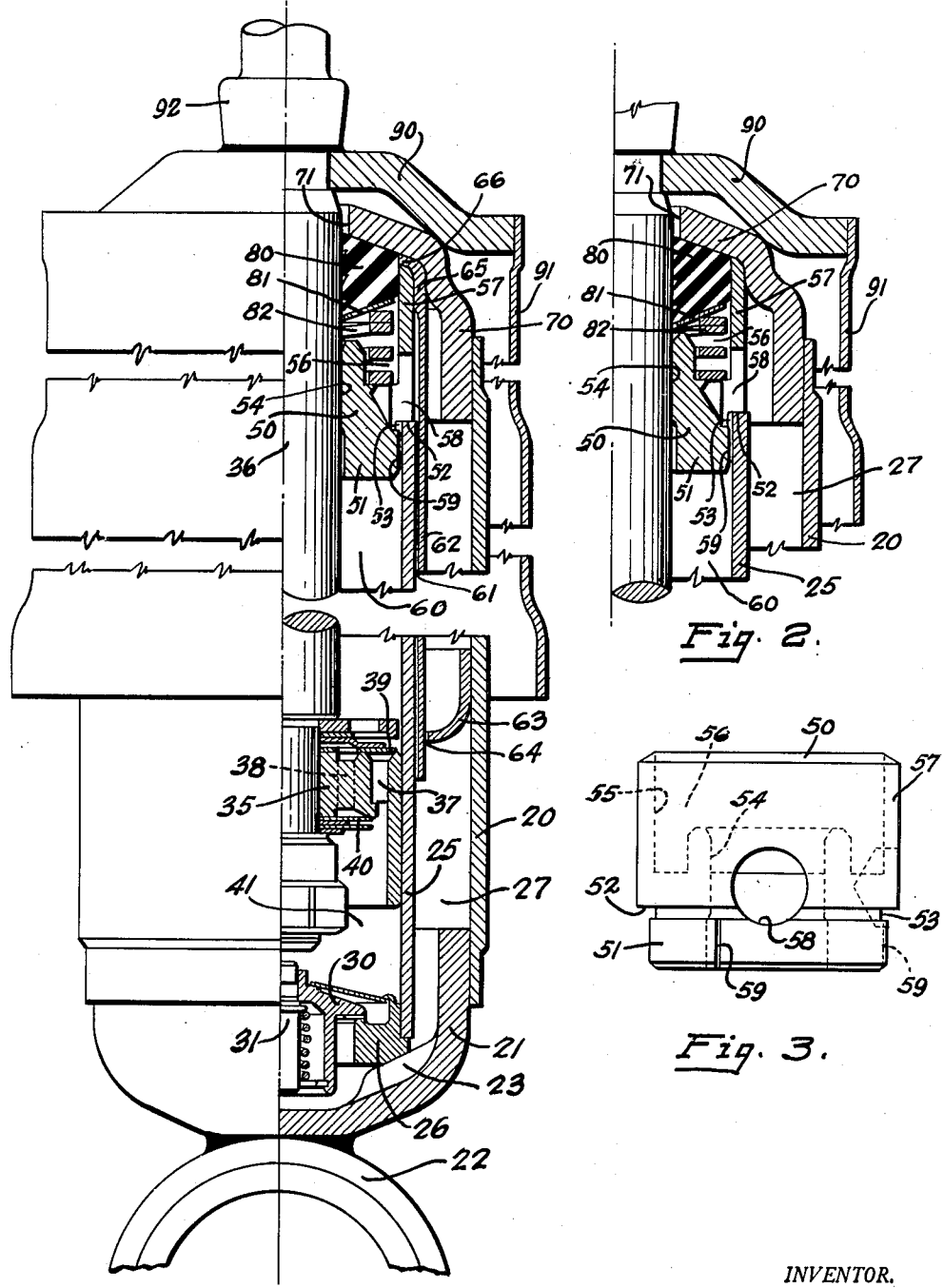

2,574,209

UNITED STATES PATENT OFFICE 2,574,209

ROD PACKING FOR SHOCK ABSORBERS

Mearick Funkhouser, Dayton, Ohio, assignor to General Motors Corporation, Detroit, Mich., a corporation of Delaware Application March 17, 1948, Serial No. 15,295

2 Claims. (Cl. 188—100)

This invention relates to improvements in hydraulic shock absorber of the direct acting type.

It is among the objects of the present invention to provide a direct acting, hydraulic shock absorber of simple structure and design in which the various tubular elements, one surrounded by another, are rigidly held against relative radial movement, thereby maintaining concentricity between all of the tubes and their respective parts and the rod of the piston which reciprocates within the innermost tube or cylinder.

Further objects and advantages of the present invention will be apparent from the following description, reference being had to the accompanying drawings wherein a preferred embodiment of the present invention is clearly shown.

In the drawings:

Fig. 1 is a side view of the shock absorber built according to the present invention, one half of the shock absorber being shown in elevation, the other half in section.

Fig. 2 is a fragmentary sectional view of a portion of the shock absorber shown in Fig. 1, one element thereof, however, being omitted.

Fig. 3 is a detail view of the rod guide in one end of the cylinder.

Referring to the drawings, the numeral 20 designates the tubular casing of the shock absorber, closed at one end by the closure member 21 which has a member 22 attached thereto for purposes of securing this portion of the shock absorber to one of the two relatively movable members whose movement is to be controlled. Spaced radial ribs 23 are provided within the closure member 21.

Another tubular member termed the cylinder 25, has an end member 26 which rests upon the radial ribs 23 of the casing closure member 21. Cylinder 25 is of such a diameter that an annular space 27 is formed between it and the casing said space being termed the fluid reservoir. The cylinder end member 26 has two valves 30 and 31. Valve 30 normally prevents the flow of fluid from the cylinder into the reservoir but is operative to permit fluid to flow from the reservoir 27 into the cylinder. Valve 31, on the other hand, prevents fluid from flowing from the reservoir into the cylinder, but is operative to establish a restricted flow of fluid from the cylinder into the reservoir. As shown in Fig 1, when the end member 26 of cylinder 25 rests upon the closure member 21 of the casing 20, the opposite, outer end of the cylinder falls beneath the level of the adjacent, outer end of casing 20.

A piston 35 having a rod 36 attached thereto, is reciprocative in the cylinder 25. Rod 36 extends centrally of the cylinder and beyond the outer end of the casing 20. The piston 35 has two sets of through passages 37 and 38, providing for the transfer of fluid from one side of the piston to the other as said piston is reciprocated. Valve 39 normally closes passages 37 to prevent fluid flow therethrough when the piston 35 moves upwardly, away from the closure member 26 of the cylinder. During this movement of the piston 35, valve 40, which normally closes passages 38 is operative to permit a restricted flow through the piston into the working chamber 41 beneath the piston. However, when the movement of the piston is reversed, that is, when the piston is moved downwardly, toward the closure member 26, then valve 39 is operative to permit a flow of fluid from chamber 41 through the piston, while valve 40 closes passages 38. Thus fluid flow through the piston in both directions is predeterminately controlled.

As stated heretofore, it is among the objects of the present invention to secure certain of the elements of the shock absorber rigidly one to another in order to prevent any radial movement or displacement therebetween. This is accomplished by constructing the shock absorber in the following manner.

A rod guide 50 forms a closure member for the upper end of the cylinder 25, or more specifically the end of the cylinder opposite the closure member 26. This rod guide is in the form of a plug having a reduced diameter portion 51 which telescopically fits into the cylinder, the shoulder 52 formed by said reduced portion, engages and rests upon the outer annular edge of the cylinder as shown in Figs. 1 and 2. An annular groove 53 is provided in the peripheral surface of the reduced diameter portion 51 adjacent this shoulder 52. The rod guide 50 has a central opening 54, concentric with the outer peripheral surfaces of both the main body portion and the reduced diameter portion 51 of the guide, the piston rod 36 being slidably supported in this opening.

The end of the rod guide 50, outside the cylinder 25 is recessed as at 55 making the guide cup-shaped to provide an outer chamber 56 surrounded by the annular wall 57. A hole 58 in the wall 57 connects the outside of the guide wall 57 with the annular groove 53 and also with the chamber 56. Shallow grooves 59 sometimes more in the form of scratches in the outer peripheral surface of the reduced diameter portion 51 of the rod guide, cooperate with the inner wall of the cylinder to form restricting passages connecting the chamber 60 in the cylinder between rod guide 50 and the piston 35 with the annular groove 53.

Surrounding the cylinder 25 for a portion of its length so as to form a shallow annular space 61 round said cylinder, is a baffle tube 62. This baffle tube is sufficiently long so that its lower end dips beneath the normal level of the fluid inside the reservoir space 27. An annular baffle ring 63 is attached to the interior of the casing 20, the inner annular edge of said ring being in juxtaposition to the tube 62 so as to form an annular, fluid restricting passage 64 between said tube 62 and ring 63.

The end of the baffle tube 62, adjacent the outer edge of the rod guide wall 57 is thickened as at 65 so that it will fit snugly about said annular wall portion 57 of the guide. This snug fit of tube portion 65 about the guide wall 57 is above the opening 58 in said guide wall so that said opening is always in communication with the annular space 61 between the cylinder and baffle tube. The end of the baffle tube 62 is flared inwardly so as to provide flange 66 which engages and rests upon the outer edge surface of the guide wall 57. Fitting about the portion 51 of the guide 50, the cylinder 25 is thus held rigidly concentric with the opening 54 in said guide and consequently with the piston rod slidable in said opening. Baffle tube 62 is also held rigidly concentric with the rod 36 for said tube fits snugly about the guide wall 57.

The end of the casing 20, opposite its closure member 21, has a cover cap 70 secured thereto. Figs. 1 and 2 show this inverted cup-shaped, cover cap 70 fitting telescopically within the casing. A portion of the cover cap of Fig. 1 is contoured to fit snugly about that portion of the baffle tube which fits snugly about the rod guide wall portion 57, and also to fit upon the inwardly extending flange 66 of the baffle tube. An opening 71 in the cover cap is coaxial of the cap portions which fit about the baffle tube 62 and into the casing 20. Thus with cap 70 fitting snugly about the tube 62, which, fitting about the rod guide, is itself rigidly held concentric of the rod guide opening 54, cap 70 and its opening 71 will likewise be held rigidly concentric of said rod guide opening.

A resilient packing ring 80 surrounds the piston rod portion extending through the outer chamber 56. An abutment ring plate 81 engages the packing ring 80 and a spring 82 is interposed between said abutment ring and the bottom wall of the recess 55 in the rod guide. This spring urges the resilient packing ring 80 into sealing engagement with the annular surface of the piston rod, the inside of the cover cap 70, the inner edge of the flange 66 when tube 62 is used and the rod guide wall portion 57.

Any fluid which might leak past the piston rod and the rod guide into chamber 56 will not leak from said chamber excepting through opening 58 in the rod guide wall, from where the fluid will pass through the annular space 61 between tube 62 and the cylinder 25 to the fluid supply in the fluid reservoir 27. Likewise, any air in chamber 60 of the cylinder may pass through the restricted passages formed by grooves 59, into the annular groove 53, through opening 58 and thence through annular space 61 into the fluid supply in the reservoir from where the air will rise, pass through the annular space 64 between the baffle ring 63 and tube 62 to accumulate and be trapped in the upper region between the tube 62 and cover cap 70.

The piston rod 36 extending through and beyond the opening 71 in the cover cap 70 has a disc 90 attached thereto and the disc 90 has a tube 91 fitting about it and secured thereto. This tube 91 forms a guard surrounding the casing 20 for a portion of its length. A member 92 is secured to the piston rod, by means of which said rod is attachable to the other relatively movable member whose movement is to be controlled.

In the Fig. 2, the baffle tube 62 is dispensed with and cover cap 70 is shaped to fit directly about the wall portion 57 of the rod guide 50. When assembling, the cover cap is forced into the casing 20 until said cover cap rigidly clamps the cylinder assembly upon the radial ribs 23 of the closure member 21 of said casing. The cover cap is then secured to the casing, in the present showing preferably by welding.

Thus it may be seen that by the present construction the cylinder, baffle tube, cover cap and casing are all rigidly held concentric to each other and to the rod containing opening 54 in the rod guide 50 thereby preventing any relative movement radially or sidewise between the elements mentioned.

While the embodiment of the present invention as herein disclosed, constitutes a preferred form, it is to be understood that other forms might be adopted, all coming within the scope of the claims which follow.

What is claimed is as follows:

1. A device providing a rod guide, stuffing box and centralizing closure member for the two concentric inner and outer tubes of a direct acting hydraulic shock absorber said device consisting of a centrally apertured plug through which a rod may slidably extend, said plug having one portion thereof adapted telescopically to extend into the inner tube to form a closure therefor and another cylindrical portion forming a packing box; a packing in said box encircling the rod and engaging the inner wall of the box; a centrally apertured cap fitting upon the cylindrical portion of the plug said cap having a flared cylindrical skirt surrounding the said cylindrical extension and adapted to be telescopically secured to the outer tube to hold the inner and outer tubes in concentricity; and resilient means in the box, urging the packing into sealing engagement with the rod, the cap and the interior wall of the box.

2. A device providing a rod guide, stuffing box and centralizing closure member for the two concentric tubes of a direct acting hydraulic shock absorber, said device consisting of a centrally apertured plug through which a rod may slidably extend, said plug being adapted telescopically to fit into the inner tube to form an end closure member therefore and having a cylindrical, integral extension substantially the same diameter as said inner tube, said extension forming a packing box; a packing in said box, encircling the rod and engaging the inner wall of the box; a centrally apertured, cup-shaped cap invertedly resting upon the cylindrical extension of the plug, forming a closure member for the packing box, the depending annular wall of the cap being spaced from and concentrically surrounding the said cylindrical extension, and providing means adapted telescopically to be attached to the outer tube to hold it concentric of the inner tube; and resilient means in the packing box, constantly urging the packing into sealing engagement with the rod, the cap and the inner wall of the box.

MEARICK FUNKHOUSER.

REFERENCES CITED

The following references are of record in the file of this patent:

UNITED STATES PATENTS

| Number | Name | Date |
|---|---|---|
| 343,003 | Brownell | June 1, 1886 |
| 1,652,142 | Goddu | Dec. 6, 1927 |
| 2,020,122 | Padgett | Nov. 5, 1935 |
| 2,093,572 | Padgett | Sept. 21, 1937 |
| 2,144,583 | Focht | Jan. 17, 1939 |
| 2,394,355 | Beecher | Feb. 5, 1946 |